United States Patent [19]
Chou et al.

[11] Patent Number: 4,932,054
[45] Date of Patent: Jun. 5, 1990

[54] METHOD AND APPARATUS FOR PROTECTING COMPUTER SOFTWARE UTILIZING CODED FILTER NETWORK IN CONJUNCTION WITH AN ACTIVE CODED HARDWARE DEVICE

[76] Inventors: Wayne W. Chou, 25 Hauley Pl., Ridgefield, Conn. 06877; Richard E. Erett, 78 White Birch La., Stamford, Conn. 06905

[21] Appl. No.: 245,714

[22] Filed: Sep. 16, 1988

[51] Int. Cl.⁵ ............................................. G06F 13/14
[52] U.S. Cl. ........................................ 380/4; 380/25; 380/50; 340/825.31; 340/825.34
[58] Field of Search .......... 364/200, 900, 246.6–246.9, 364/286.6, 969, 969.1–969.4, 971.1; 380/3–5, 23–25, 49, 50; 340/825.31, 825.34; 235/380, 382

[56] References Cited

U.S. PATENT DOCUMENTS

| | | | |
|---|---|---|---|
| 3,609,697 | 9/1971 | Blevins et al. | 364/200 |
| 4,562,306 | 12/1985 | Chou et al. | 380/4 |
| 4,634,807 | 1/1987 | Chorley et al. | 380/4 |
| 4,683,968 | 8/1987 | Appelbaum et al. | 380/4 |
| 4,757,533 | 7/1988 | Allen et al. | 380/25 |
| 4,757,534 | 7/1988 | Matyas et al. | 380/25 |
| 4,791,565 | 12/1988 | Dunham et al. | 364/200 |
| 4,796,181 | 1/1989 | Wiedemer | 380/4 X |
| 4,799,258 | 1/1989 | Davies | 380/23 X |
| 4,799,635 | 1/1989 | Nakagawa | 364/900 |
| 4,817,140 | 3/1989 | Chandra et al. | 380/4 |
| 4,819,267 | 4/1989 | Cargile et al. | 380/23 |
| 4,827,508 | 5/1989 | Shear | 380/4 |

Primary Examiner—Stephen C. Buczinski
Assistant Examiner—Bernarr Earl Gregory
Attorney, Agent, or Firm—Parmelee, Bollinger & Bramblett

[57] ABSTRACT

Filter networks are incorporated within a software protection hardware device which is plugged into a communications port of a computer which device will select bits or combinations of bits emanating from the communications port resulting from commands of a controlling software in use with the computer which is desired to be protected. The filter networks select the bits of a disguised predetermined control code which when matched with a stored reference code results in an output from the filter used to activate functions within the protection device. A stream of bits including a disguised predetermined control code issuing from the computer through the security device are compared with a stored reference code in a programmable memory. When a match occurs an output emanates providing an acknowledgment code to the computer indicating that the hardware device has been plugged in and is a proper one. The stored reference code can be provided by a programmable memory using an intermediate storage register between the programmable memory and the selection network. The intermediate storage register is clocked changing the reference code in a predetermined manner. Accordingly, the reference code is changed in accordance with what is stored in the programmable memory and by the content of an intermediate register at any given time, the effect of which is to continually change the reference code by clocking the intermediate register.

15 Claims, 5 Drawing Sheets

METHOD AND APPARATUS FOR PROTECTING COMPUTER SOFTWARE UTILIZING CODED FILTER NETWORK IN CONJUNCTION WITH AN ACTIVE CODED HARDWARE DEVICE

BACKGROUND OF THE INVENTION

This invention relates to a security system for the protection of computer programs, and more particularly to such a system which employs a software protection hardware device which is plugged into a communications port of a computed and distinguishes a disguised predetermined code hidden within a stream of signals emanating from the computer by comparing the disguised predetermined code with a stored reference code which itself may be changed and used to decode the computer transmission under the control of the software to be protected.

Hardware based software protection devices have been proposed in which the security device is plugged into a communications port of a computer via an interface connector through which signals to and from the computer are exchanged. One example is U.S. Pat. No. 4,562,306 to the inventors of the present application, in which an actively coded hardware device is used to protect computer software. In this patent the hardware security device is attached to an interface connector which is plugged in to a communications port of a computer through which signals pass from the computer to the security device under the control of the software, and other signals from the security device to the computer as a response to the signals applied from the computer.

In such devices the hardware security device is usually encapsulated in plastic or epoxy in order to further enhance the security making it difficult or impossible to discover the code without tearing the device apart. However, the security may be compromised by observing the signals to and from the security device regardless of their nature by simply monitoring and studying such signals using reverse engineering to eventually break down the code or functioning of the hardware device. Accordingly, the security of the plugged in device for the software program which it is desired to protect will be primarily a function of how difficult it is to fund out what the hardware device is doing and what signals it is operating on to provide the protection. The present invention is directed to providing a deterrent which can be configured in such a manner that any attempt to decipher or emulate the signals may be deemed impractical.

SUMMARY OF THE INVENTION

Accordingly, it is an object of this invention to provide a new and improved method and apparatus for protecting computer software using a software protection hardware security device which is capable of decoding signals to the security device such that coded signals will have no special attributes over any other and random signal rendering detection of the coded signals by ordinary means of observation impossible.

Another object of this invention is to provide a new and improved software protection hardware security device which decodes a disguised predetermined control code from the computer and may do so by continually altering a stored reference code in the hardware security device.

Still another object of this invention is to provide a new and improved plug-in device for protecting computer software which permits an ever changing code predetermined by a programmer which when intermixed with false codes appears completely random to those trying to decipher a true code.

Still another object of this invention is to provide a new and improved method and apparatus for protecting computer software using a hardware plug-in device whose security lies in the fact that no logical exists for a disguised predetermined code which appears to be completely random in a maze of random information.

In carrying out this invention in one illustrative embodiment thereof, a method is provided for protecting computer software using a software protection hardware security device plugged into a communications port of a computer which is controlled by the computer software desired to be protected by generating a plurality of bits containing a disguised predetermined control code to a port of a computer under the control of the software which is desired to be protected. A software protection hardware apparatus containing an acknowledgement code is plugged into the computer port which hardware decodes the disguised predetermined control code into an operational signal in the hardware security device by comparing the disguised predetermined control code with a stored reference code and using the operational signal as an acknowledgement code to the computer. The stored reference code can be programmable and may be continually varied in a controlled manner from the computer under the control of the software.

BRIEF DESCRIPTION OF THE DRAWINGS

The invention together with further aspects, objects, advantages and features thereof, may be more clearly understood from the following description taken in connection with the accompanying drawings.

FIGS. 2, A, B, C and D are schematic diagram circuit which act as digital filters in the form of a logical AND representation providing an output when bits are high (logical 1), a logical NOR circuit providing an output when bits are low (logic 0), the combination of high and low bit filters by means of an OR gate, and an EXCLUSIVE NOR gate which is the logical equivalent of that shown in FIG. 2C.

DESCRIPTION OF THE PREFERRED EMBODIMENTS

Figure 1:
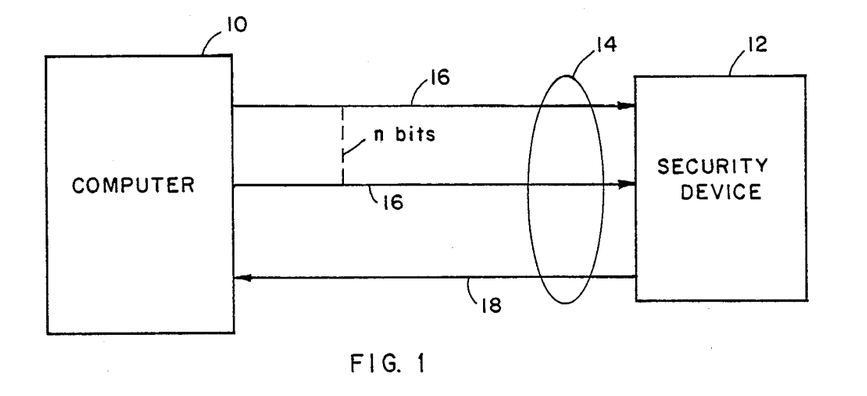
FIG. 1 is a block diagram of a computer terminal connected to an active hardware device which is utilized for software protection.

Referring now to FIG. 1, which shows the basic arrangement having a computer 10 and a software protection security device 12 being connected to a port of the computer via an interfacing connector 14 which permits the communication between the computer 10 and the hardware security device 12. The interface connector 14 includes a plurality of lines 16 for transmitting a plurality of bits from the computer to the security device 12. The interconnector 14 also contains a line 18 through which a signal of acknowledgement is provided. The signals sent to the security device in the form of bits are generally under control of a specific software program running in the computer whereas the signals returning from the security device 12 are in response to the signals transmitted thereto from the computer. If the signals from the security device 12 in response to those from the computer are determined by the software as being proper and correct, it is then generally assumed that a proper security device has been connected to that computer port. The vulnerability of the system illustrated in FIG. 1 resides in the interface connector 14 which may be tapped and the signals to and from the security device 12 can be monitored, studied and by the application of reverse engineering, the operation of the security device can be broken and emulated.

In accordance with the present invention a disguised predetermined control code which is sent over the lines 16 of the interconnector 14 is compared with a stored reference code, and decoded in apparatus which is incorporated and contained in the security device 12. The predetermined control code has no special attributes over any other random signal and could only be determined and used in the decoder, accordingly rendering detection of the internally coded signals by an ordinary means of observation impossible. The stored reference code inclusive in the security device is not the same as, and should not be confused with the disguised predetermined control code required to cause the security device to respond. The stored reference cod in the security device 12 may be altered by means of apparatus either directly or indirectly as a result of signals from the computer under the command from software which is operating the computer and which is desired to be protected. The everchanging local stored reference code although predetermined by the programmer when intermixed with the other signals appearing as bits on the interconnector line 16 would appear to be completely random to an outside observer since the true disguised predetermined reference code cannot be distinguished from any other series of signals which are fed to the security device and need appear no more frequently than would occur if they were part of a truly random sequence. Thus, in accordance with the present invention the security of the system will lie in the fact that no logical sequence exists in a totally random field making the apparatus extremely difficult to reverse engineer. Both the control code and the reference code are of necessity sequentially varied using the same sequence for both.

Referring first to FIG. 2, apparatus and its several variants will be described for coding and decoding signals applied to the security device 12 in which the apparatus acts as a digital filter which provides an output when the input signals match a given reference in accordance with digital logic convention. For example, in FIG. 2A, a simple logical AND gate 22 is shown having an input 20 and a reference input 23. When the reference input 23 is at logic 1, an output 24 will be a true logic 1 when an input 20 matches its reference 23. Similarly, in FIG. 2B which illustrates a logical NOR gate 25 provides an output 28 which is a logical 1 when the input 26 matches the reference input 27 at a logical 0. These types of output become analagous to a high and a low pass single bit filter in FIGS. 2A and 2B, respectively. It will be appreciated that the filter does not pass anything but simply indicates a match whenever there is a high or a low bit present at the input of the logical gate.

Figure 2A:
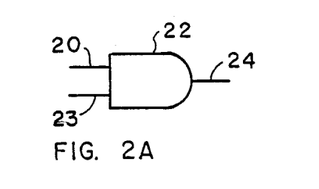
Figure 2B:
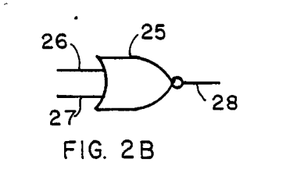
Figure 2C:
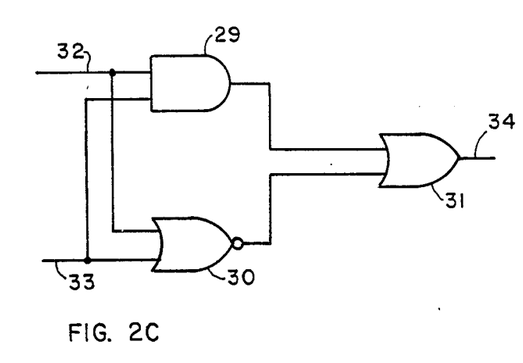
Figure 2D:
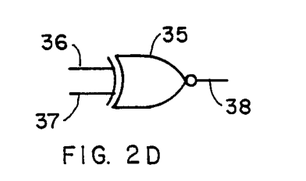

FIG. 2C illustrates the combination of the high and low bit filters by means of an AND gate 29 and a NOR gate 30 each having common input 32 and a common reference input 33 whose respective outputs are applied to the input of an OR gate 31. The output 34 of the OR gate 31 is a true logic 1 whenever the input level 32 matches the reference level 33, and accordingly, by selecting a given reference, a single bit level may thus be filtered. In FIG. 2D, a schematic representation is shown of an EXCLUSIVE NOR gate which is the logical equivalent of the circuit shown in FIG. 2C. An EXCLUSIVE NOR gate 35 has an input 36 and a reference input 37 applied thereto and an output 38 is provided whenever the input 36 matches reference input 37 thereby producing a logical 1 at the output 38. An EXCLUSIVE OR gate can be used when selecting the complement of the EXCLUSIVE NOR gate. In view of the simplicity and versatility of the EXCLUSIVE NOR gate 35, it will be used in explaining the present invention in preference to other configurations illustrated in FIG. 2. However, it should be apparent to those skilled in the art that such a preference is not considered to limit the present invention to the chosen illustrations as other filters may be utilized depending on the particular application and the effect desired. In addition, it should be pointed out that for purposes of discussion although positive logic convention may be used for illustrative purposes, it is equivalent to negative logic convention and further, anyone skilled in the art may, for convenience or otherwise, combine both types of logic convention for a given design application. Failure to illustrate all the variances due to specific logic elements should not be considered limitations on the scope of the present invention.

Figure 3A:
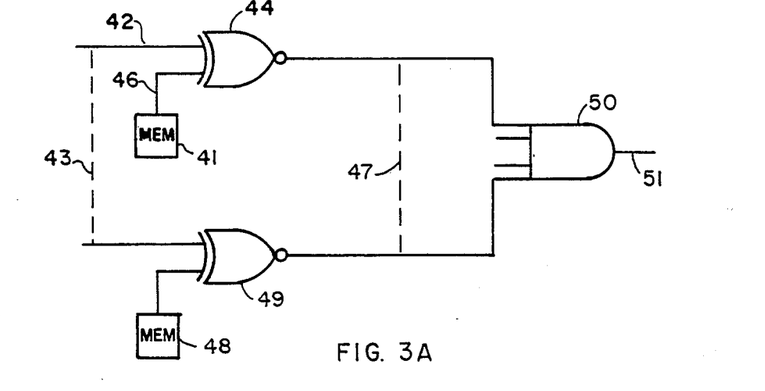
FIG. 3A is a schematic diagram illustrating two or more of the bit filters illustrated in FIG. 2 being combined using an AND gate to form a byte filter.

Referring now to FIG. 3A, an implementation of the present invention is illustrated using an EXCLUSIVE NOR gate of the type illustrated in FIG. 2D. In FIG. 3 EXCLUSIVE NOR gates 44 and 49 are illustrated and the exact number of EXCLUSIVE NOR gates utilized will depend on the number of bits 43 supplied from different lines from the computer. Each EXCLUSIVE NOR gate is supplied with a memory cell namely, memory 41 for EXCLUSIVE NOR gate 44, and memory 48 for EXCLUSIVE NOR gate 49. Each memory cell will provide the reference for its respective bit which is transmitted via the line 16 of the connector 14 from the computer 10. The memory cells 41 and 48 may be any means which provide provide one state or another including hand wiring the reference input to a high or a low which is the simplest form, or may comprise a more sophisticated electrically programmable cell. As illustrated in FIG. 3A, when two or more of the bit filters represented by the EXCLUSIVE NOR gates 44 and 49 are combined as shown having their input applied to an AND gate 50, a byte filter is formed in which only a correct combination of bits 43 which are inputted to the filters will pass the AND gate 50 as the true byte output 51. Accordingly, a disguised predetermined control code which has been encoded in the computer and is transmitted via the interconnector 14 to the security device 12 is in the form of 0 to n number of bits which are applied to EXCLUSIVE NOR gates 44, 49 etc., each having a reference memory, for example 41 and 48, respectively, in which the transmitted bits 0 to n are compared with their respective references formed by the bit memories, for example 41 and 48 for EXCLUSIVE NOR gates 44 and 49, respectively, producing compared outputs 47 which are applied to the n bit AND gate 50 producing a true output 51 when and only when a byte represented by the n number of bits 43 which pass the digital filter of FIG. 3A. The output 51 represents the decoded disguised, predetermined control code which was originally encoded prior to its exit from the computer 10. It is believed apparent that the large number of bits from the computer and references provided by the different memory cells begin to confuse anyone who is trying to tap into the line to try and determine how the device is functioning.

Figure 3B:
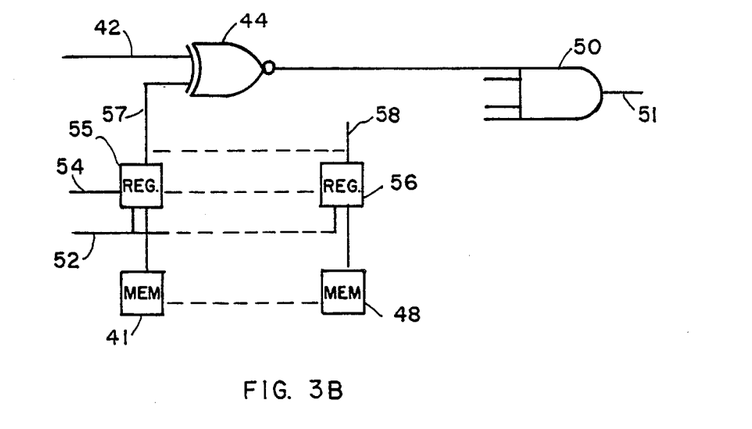
FIG. 3B illustrates a schematic diagram showing one stage of an EXCLUSIVE NOR gate of the same byte filter as illustrated in FIG. 3A modified with a changing reference code.

In order to make that task of reverse engineering more difficult, it has been stated that it is desirable to change the reference code actively at the security device 12 under software control, either directly or indirectly. FIG. 3B illustrates one stage of an EXCLUSIVE NOR gate filter 44 of the same type of bit filter as illustrated in FIG. 3A which instead of using a fixed memory 41, a temporary memory 55 is substituted therefor which may be part of a counter, of a ring type or any other incrementing or decrementing type, a shift register or any other combination of flip-flop stages which can be toggled or switched to produce a predictable change in its output state. Thus, in the circuit shown in FIG. 3B the fixed memory 41 supplying a reference input 46 to the EXCLUSIVE NOR gate 44 is first applied to a temporary memory 55 which may be loaded by line 52 initially by the memory cell 41. By applying a clock advance 54 to the temporary memory 55 produces outputs which change in the manner prescribed by the way in which the flip-flops are interconnected and interdependent The clock 54 allows considerable freedom of choice of how derived It may be the result of a complex function of various input sequences from the computer yielding a very indirect relationship between the input values and the clock itself, or it may be direct and the clock can be the result of any filtered output thus changing the code each time the filter passes a true word. Innumerable varieties can be provided. In the illustrated example, the clock advance 54 will produce a changing reference 57 from the temporary memory 55 which is applied to the EXCLUSIVE NOR gate 44. If this corresponds to the coding provided for the bit information on line 42 which is coded before leaving the computer, a match will still produce an output which is supplied to the AND gate 50 which requires a number of matched bits to provide a byte output 51. Another fixed memory 48 is applied to a temporary memory 56 producing another changing reference 58 which is applied to EXCLUSIVE NOR gate. The number of stages of fixed and temporary memories need not necessarily equal the number of filters as some stages may be skipped and some stages may be shared in accordance with the coding and the design of the filter by the user for a specific application. It is believed apparent however, that in providing the building blocks as illustrated in FIGS. 3A and 3B that an endless variety embodying the basic concepts of the invention can be provided with any level of desired sophistication. The only limiting factors will reside in the complexity and cost and that will depend on how far a user wishes to go in providing protection. Very simple approaches such as demonstrated in FIGS. 3A and 3B may provide adequate for the purpose.

Figure 4:
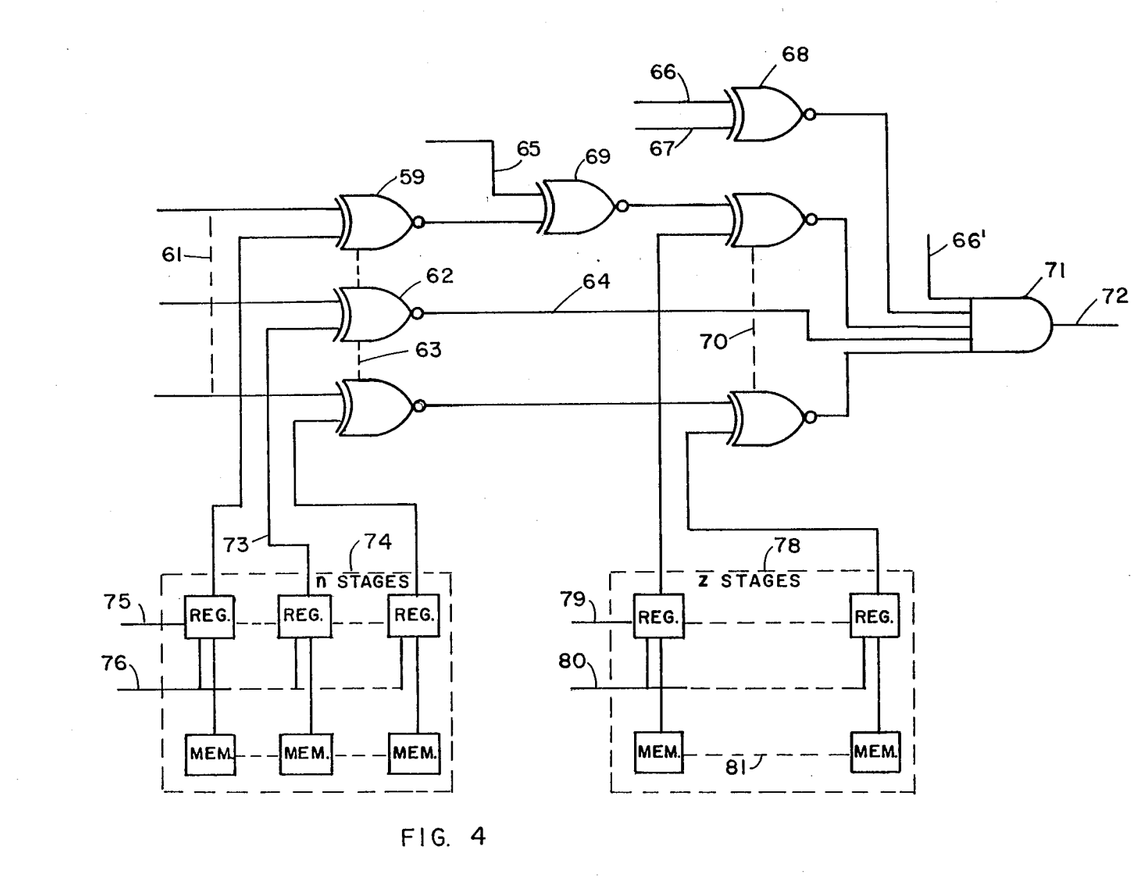
FIG. 4 illustrates a schematic block diagram illustrating how a basic filter and associated register stages with memory can be used in varying ways to produce an overall filter which is the product of the function of two basic groups of filters.

FIG. 4 illustrates the implementation of the basic filter and associated register stages with memories to produce an overall filter which is a product of the functions of two basic groups of filters represented by n stages 74 which provide changing reference inpus to EXCLUSIVE NOR gates 59, 62 and 63 or more depending on the number of inputs 61 and cascaded z stages 78 which provides changing reference inputs to a plurality of EXCLUSIVE NOR gates 70. Several variants have been included in the circuit arrangement of FIG. 4 to further illustrate the endless variety of changes which can be made to the system to complicate a reverse engineering task in trying to determine what the hardware security device 12 is doing. One variant is provided by the EXCLUSIVE NOR gate 62 which omits one of the EXCLUSIVE NOR gates 70 and one of the inputs from the z register stages 78. Accordingly, the output of the EXCLUSIVE NOR gate 62 is connected directly to the input of an AND gate 71 so that the EXCLUSIVE NOR gate 62 is in effect, not cascaded with an EXCLUSIVE NOR gate from filter stages 70. Another variant is illustrated by inserting an EXCLUSIVE NOR gate 69 between the output of EXCLUSIVE NOR gate 59 and the input of an EXCLUSIVE NOR gate in the filter stages 70. The input 65 of the EXCLUSIVE NOR gate 69 imposes an initial condition on the input, the function of which further modifies the output as a result of this particular 65 input. In addition, other attributes 66 from other sources against other references 67 are filtered by the EXCLUSIVE NOR gate 68 before being applied to the AND gate 71. Finally, outputs 66' from other systems logic may also be applied to the AND gate 71. Accordingly, the output 72 from the AND gate 71 yields a logic 1 when and only when all of the conditions of all of these EXCLUSIVE NOR gates 62, 63 68 and those stages in 70 in combination with EXCLUSIVE NOR gate 59 and 69 are coincidentally true. However, true can mean in portions of the illustration, either positive or negative logic depending on the reference states of the cascaded filters. For example, if all the EXCLUSIVE NOR gate inputs 61 matches that of the n references of stages 74, a logic 1 will appear at each output of the n input byte filter. However, if the zth reference stage of stages 78 contains a 0, then the only way a 1 will appear at the output is if all the inputs of the AND gate are 1's which includes the zth filter stage 70. This means that the output of the nth filter must also be 0 and that the nth input 61 must be dissimilar with its reference stage. The output, then is not merely the ANDed n output of the several sources, but in the case of cascaded filter elements becomes additionally the ANDing of the result of the function of a function of yet another function, etc. In the case of the illustration in FIG. 4, the output is a result of filtered AND inputs which is a function of n references which is also a function of z references except for the input of filter 62 since its output is directed only to the input of the AND gate 71, and with the exception of the EXCLUSIVE NOR gates 69 whose function is also a function of another attribute 65, all of which must occur simultaneously along with a true bit output from the filter 68 as well as other system logics 66'. Although the illustrative circuit in FIG. 4 serves to show how the various possibilities in applying the concept and building blocks of the byte filter can be used in a specific way, it more importantly illustrates the endless variance possible in accordance with the concepts and approach utilized in this invention.

In regard to FIG. 4 which illustrates different variations in logical output, no attempt has been made to illustrate conservation in elements or other potential connections which would yield the same logical output. For example, if the column of filters 70 were removed from the position as shown in FIG. 4 and instead used to compare the n register stages 74 and the z register stages 78 at the respective inputs of the filter 70, the outputs of 20 which are then used as references to the filters 59, 62 and 63 instead of a direct connection to the n register stages 74 as shown, the output 72 would be equal to the same Boolean expression as the output illustrated in FIG. 4. Again, the concept of the filter with a memory reference which memory can be a temporary register that can be clocked to change the value of the reference is a feature of the present invention and not the various connections which are only illustrative examples to demonstrate the invention, its usefulness and operation.

Figure 5:
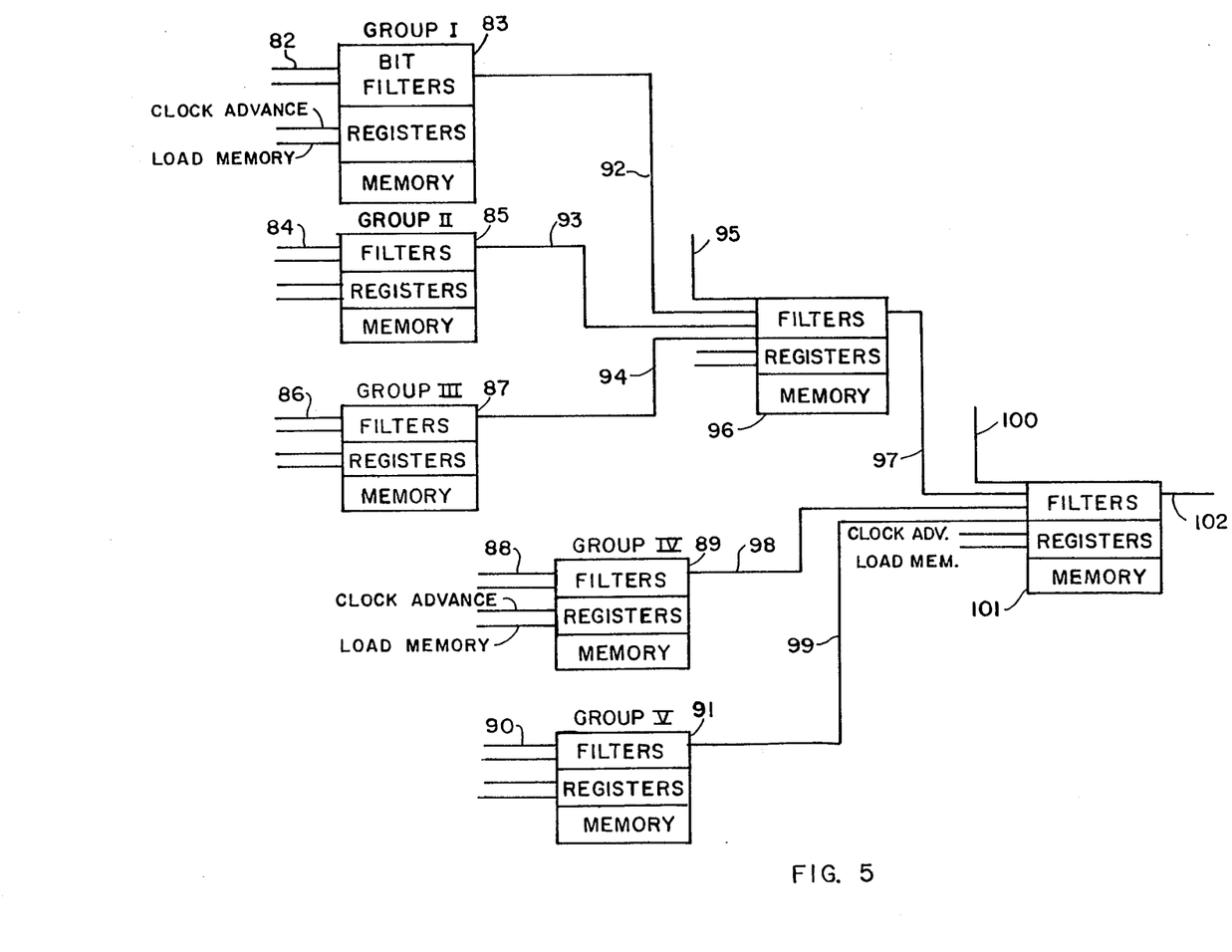
FIG. 5 is a block diagram which illustrates an inter connection of several groups of filters for decoding a group of inputs which block diagram is built upon and is an extension of the approach used in the circuits of FIG. 4.

FIG. 5 illustrates an interconnection of a plurality of building blocks which were used in FIG. 4 to decode a group of n inputs with an output corresponding to a successful decoding of that group to create a hypothetical hierarchal structure, which of course, may be varied at the desire of the designer. In order to simplify the illustration of FIG. 5, all filter groups are assumed to have the same characteristics as those illustrated in FIG. 4. Filters 83, 85 and 87, having filter Group I, II and III inputs 82, 84 and 86 respectively, the outputs 92, 93 and 94 of which feed into a filter 96 where along with other inputs 95 are compared with the memory register x. To pass the filter 96 with true output 97, the input Groups I, II, III must pass the second level of security represented by the code in register x of filter 96. Similarly, to achieve a final output 102, the original input Groups I, II and III must additionally pass the third level comparison of register y in filters 101. These along with the second level test for inputs 88 and 90 from Groups IV and V, respectively, and inputs 95 to filter 96 and also inputs 100 to filter 101.

Figure 6:
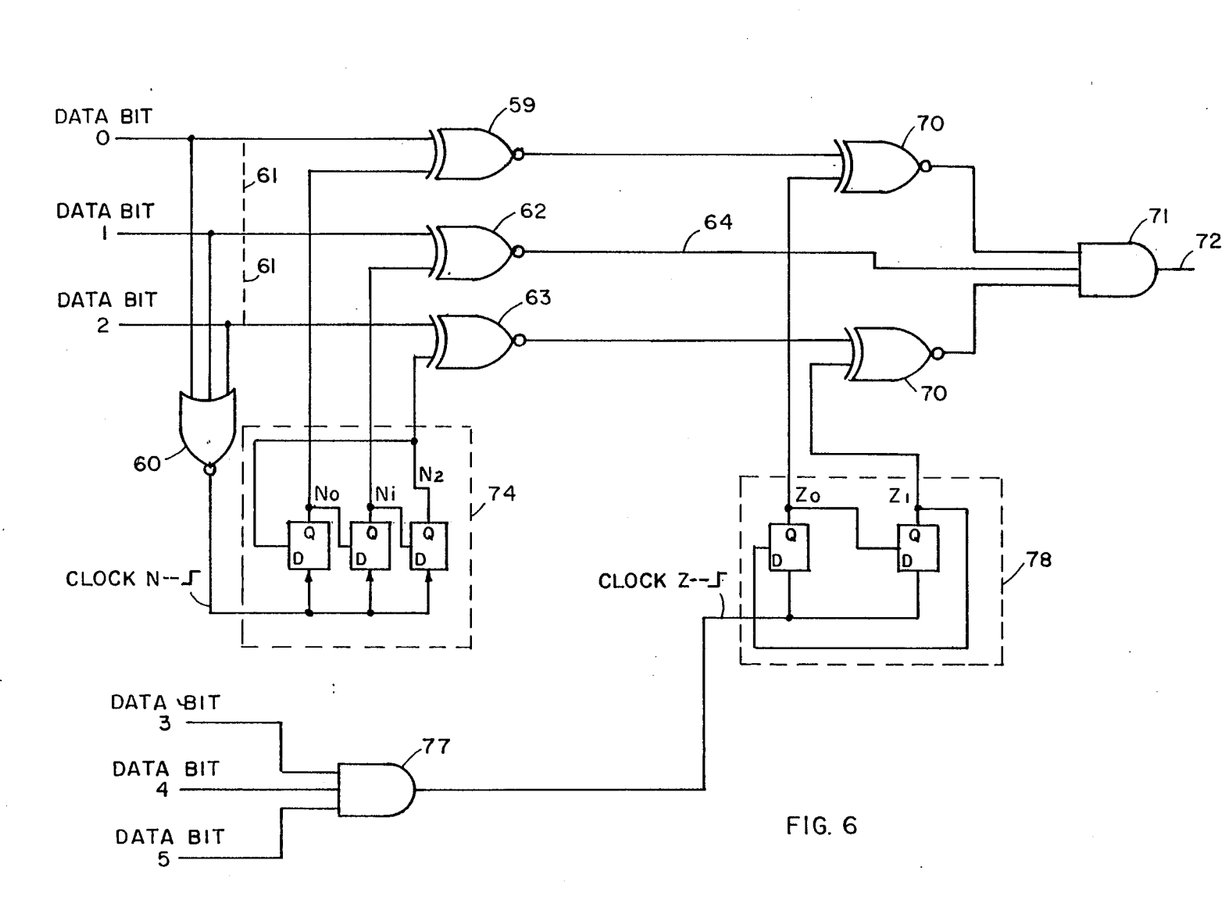
FIG. 6 is a simplified block diagram of FIG. 4 using the same reference numerals for corresponding components with registers clocked as a direct result of input data to aid in explaining the rationale of one illustrative embodiment of this invention.

In order to aid in understanding the rationale of the present invention, reference is now made to FIG. 6 which is a simplified version of FIG. 4 in which the registers are clocked as a direct result of input data. In FIG. 6 data bits 0, 1 and 2 are applied via data lines 61 to the input of EXCLUSIVE NOR gates 59, 62 and 63, respectively, and at the same time to a logical NOR gate 60 which applies its output in the form of clock pulses N to a three stage ring register 74. The register 74 produces reference outputs $N_0$, $N_1$ and $N_2$ which are applied to the reference input of EXCLUSIVE NOR gates 59, 62 and 63, respectively. The clock pulse N is a combination of ($\overline{\text{data bit 0} + \text{data bit 1} + \text{data bit 2}}$). Data bits 3, 4 and 5 are applied to AND gate 77 which generates a clock pulse Z equal to data bit 3 × data bit 4 × data bit 5 which is applied to the two stage ring register 78 having outputs $Z_0$ and $Z_1$ which are applied to the reference inputs of EXCLUSIVE NOR gates 70 as shown. One example of the loading of the registers as well as the data input bit vs output results with the registers loaded are shown in the Truth Table as follows:

| | TRUTH TABLE | | | |
|---|---|---|---|---|
| | 1st Six Data Bits | N Register Contents | Z Register Contents | |
| Program Step No. | 0 1 2 3 4 5 | $N_0 N_1 N_2$ | $Z_0 Z_1$ | Out |
| 0 | INITIAL LOADING | 0 1 1 | 1 0 | NA |
| 1 | 1 0 1 1 0 1 | 0 1 1 | 1 0 | 0 |
| 2 | 1 1 1 0 0 0 | 0 1 1 | 1 0 | 0 |
| 3 | 0 0 0 1 0 1 | 1 0 1 | 1 0 | 0 |
| 4 | 0 1 0 1 1 1 | 1 0 1 | 0 1 | 0 |
| 5 | 0 0 0 1 1 0 | 1 1 0 | 0 1 | 0 |
| 6 | 0 1 0 1 1 0 | 1 1 0 | 0 1 | 1 |
| 7 | 0 1 0 1 1 1 | 1 1 0 | 1 0 | 0 |
| 8 | 0 1 0 1 1 0 | 1 1 0 | 1 0 | 0 |
| 9 | 1 1 1 0 1 0 | 1 1 0 | 1 0 | 1 |
| 10 | 0 0 0 1 1 1 | 0 1 1 | 0 1 | 0 |
| Rerun same data | | | | |
| 1a | 1 0 1 1 0 1 | 0 1 1 | 0 1 | 0 |
| 2a | 1 1 1 0 0 0 | 0 1 1 | 0 1 | 1 |
| 3a | 0 0 0 1 0 1 | 1 0 1 | 0 1 | 0 |
| 4a | 0 1 0 1 1 1 | 1 0 1 | 1 0 | 0 |
| 5a | 0 0 0 1 1 0 | 1 1 0 | 1 0 | 0 |
| 6a | 0 1 0 1 1 0 | 1 1 0 | 1 0 | 0 |
| 7a | 0 1 0 1 1 1 | 1 1 0 | 0 1 | 1 |
| 8a | 0 1 0 1 1 0 | 1 1 0 | 0 1 | 1 |
| 9a | 1 1 1 0 1 0 | 1 1 0 | 0 1 | 0 |
| 10a | 0 0 0 1 1 1 | 0 1 1 | 1 0 | 0 |

The multi stage filter as illustrated in FIG. 6 may be plugged in or otherwise connected to the printer port of a computer, for example, a serial/parallel adapter 23 made by IBM. A typical address for such a printer port in an IBM compatible micro-computer operating in an MSDOS environment might by "888". In the specified adapter there are eight data bit lines so eight bits to a byte of which the last two are higher order bits (6 and 7) are arbitrary and have no purpose in the examples chosen for purposes of illustration. Accordingly, a typical program in BASIC takes the form of instruction; out "address", "byte value" provides signals appearing on the computer printer port as follows:

| | | Bit Values | | | | | | | |
|---|---|---|---|---|---|---|---|---|---|
| | | 1 | 2 | 4 | 8 | 16 | 32 | 64 | 128 |
| Program | | | | | Data Bits | | | | |
| Step No. | Statement | 0 | 1 | 2 | 3 | 4 | 5 | 6 | 7 |
| 1 Out | 888,45 Yields | 1 | 0 | 1 | 1 | 0 | 1 | 0 | 0 |
| 2 Out | 888,71 Yields | 1 | 1 | 1 | 0 | 0 | 0 | 1 | 0 |
| 3 Out | 888,168 Yields | 0 | 0 | 0 | 1 | 0 | 1 | 0 | 1 |
| 4 Out | 888,250 Yields | 0 | 1 | 0 | 1 | 1 | 1 | 1 | 1 |
| 5 Out | 888,24 Yields | 0 | 0 | 0 | 1 | 1 | 0 | 0 | 0 |
| 6 Out | 888,90 Yields | 0 | 1 | 0 | 1 | 1 | 0 | 1 | 0 |
| 7 Out | 888,250 Yields | 0 | 1 | 0 | 1 | 1 | 1 | 1 | 1 |
| 8 Out | 888,154 Yields | 0 | 1 | 0 | 1 | 1 | 0 | 0 | 1 |
| 9 Out | 888,87 Yields | 1 | 1 | 1 | 0 | 1 | 0 | 1 | 0 |
| 10 Out | 888,56 Yields | 0 | 0 | 0 | 1 | 1 | 1 | 0 | 0 |

As will be noted these correspond to the examples chosen in the Truth Tables for the operation and application to the filter network of FIG. 6. The outputs generated from that filter network may be connected to an acknowledgement line, for examination by the computer or may be counted, accumulated and used in different manner until an additional result is achieved and then applied to the acknowledgement line of the computer. By using a series of filter stages which are modified as the signal inputs are applied to the initial stages and passed from time to time as conditions are right in the filter, it will be apparent that simple disguised predetermined control code may be extremely difficult to detector recreate when it can be seen that the same data produces different results at different times and only the computer can evaluate the proper sequence because it has the key beforehand.

Accordingly, the use of digital byte filters with an ever changing code which gives the effect of total randomness, provides a security device which is virtually unbreakable, but which is composed of relatively simple, inexpensive, solid-state elements and components. Although the changing code appears random, it is totally predictable and decodable in the hands of its designer and can produce connections which perform functions which are dependent on other functions ad infinitum. By disguising a predetermined control code generated in a series of bits produced by the computer at the control of the software and transmitting this disguised, predetermined control code to a hardware security device plugged into a computer port and decoding that disguised, predetermined control code into an operational signal which is re-transmitted to the computer, a software protection device can be constructed which has a virtually unbreakable code. The structure can be made as simple or as complex as desired, depending on the particular design of the system. Even complex configurations using the simple changeable memories of the present invention which can be either fixed or varied simply either locally or remotely to provide change in states in a predetermined pattern determined by the software engineer. The software which is desired to be protected can be so protected to any degree of sophistication desired.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. The method of protecting computer software using a software protection hardware security device plugged into a communications port of a computer which is controlled by the computer software or software within computer control which is desired to be protected comprising the steps of:
    applying a plurality of bits containing a disguised predetermined control code thereon to a port of a computer from software which is desired to be protected,
    plugging a software protection hardware apparatus into said computer port containing a stored reference code which in at least one form corresponds to said disguised predetermined control code,
    comparing said plurality of bits containing said disguised predetermined control code in said software protection hardware with said stored reference code and passing an operational signal when a match occurs,
    utilizing said operational signal as an acknowledgement that the disguised predetermined control code is present in said plurality of bits.

2. The method of protecting computer software as claimed in claim 1 including the step of:
    continually changing said stored reference code in a predetermined controlled manner.

3. The method of protecting computer software as claimed in claim 2 wherein the step of continually changing said stored reference code involves varying the state of a memory in which a reference is stored.

4. The method of protecting computer software as claimed in claim 1 wherein the steps of comparing said disguised predetermined control code with said stored reference code involves a plurality of successive comparisons which must match before an operational signal is passed.

5. The method of protecting computer software as claimed in claim 1 wherein said comparison step involves a series of comparison stages where outputs from prior stages are compared with different reference stages to produce said operational signal when a match occurs as a result of said comparisons in said series of comparison stages.

6. The method of protecting computer software as claimed in claim 5 which comparison step involves comparing the output from a previous stage with any selected signal.

7. A software protection hardware device which is plugged into a communications port of a computer to receive a plurality of bits from the computer containing a disguised predetermined control code resulting from commands from the software controlling the computer which software is desired to be protected comprising:
    a digital decoder filter having an input and an output and a programmable memory coupled to said input for providing a stored reference code for said filter which in at least one form corresponds to said predetermined control code adapted to be plugged into a communications port of a computer,
    comparison means in said digital decoder filter for comparing an input with said stored reference code and passing a operational control signal when a match occurs,
    means for applying said plurality of bits including said disguised predetermined control code to the input of said filter,
    and means coupled between said output of said filter and said computer port for applying said passed operational control signal to said computer port when a match occurs between said control code with said reference code.

8. The software protection hardware device as claimed in claim 7 including:
    means coupled to said digital decoder filter for altering the stored reference code in a predetermined manner.

9. The software protection hardware device as claimed in claim 8 in which said means for altering the disguised predetermined code in a predetermined manner is an intermediate storage register.

10. The software protection hardware device as claimed in claim 8 wherein said digital decoder filter comprises a plurality of EXCLUSIVE NOR gates having inputs and an output and each EXCLUSIVE NOR gate having a programmable memory with a bit stored therein connected to the input thereof along with a bit of said series of bits from said computer port, an AND gate coupled to the outputs of said EXCLUSIVE NOR gates whereby only a correct combination of bits will produce an output when the bits applied correspond to the bits in memory which will produce an output from said AND gate when the proper byte is formed by said EXCLUSIVE gates.

11. The software protection hardware device as claimed in claim 10 in which each programmable memory is a temporary memory, and means coupled to said temporary memory for continually changing the output states of said temporary memories in a predetermined manner.

12. The software protection hardware device as claimed in claim 11 wherein said means for continually changing the output states of said temporary memories is an intermediate storage register.

13. The software protection hardware device as claimed in claim 7 in which said digital decoder filter comprises a plurality of filters each having a different bit of said plurality of bits from said computer applied thereto and each of which has a programmable memory with a stored reference code and means for combining the outputs of said plurality of filters when a match occurs to pass said operational control signal.

14. The software protection hardware device as claimed in claim 13 including means coupled to said memories for changing the reference code of each memory in a predetermined manner thereby controllably changing the stored reference code of each digital decoder filter.

15. The software protection hardware device as claimed in claim 13 wherein said plurality of filters are arranged in cascaded stages each having separately programmable memories controllable from different sources whereby the comparison between the plurality of bits from the computer takes place in said filter in a plurality of cascaded filters having different reference code controls.

* * * * *